United States Patent
Yang (10) Patent No.: US 9,731,765 B2
(45) Date of Patent: Aug. 15, 2017

(54) PARKING ASSIST APPARATUS AND METHOD

(71) Applicant: HYUNDAI MOTOR COMPANY, Seoul (KR)

(72) Inventor: Dong Hun Yang, Anyang-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/944,706

(22) Filed: Nov. 18, 2015

(65) Prior Publication Data

US 2017/0043808 A1 Feb. 16, 2017

(30) Foreign Application Priority Data

Aug. 12, 2015 (KR) .................. 10-2015-0114022

(51) Int. Cl.
*B62D 15/02* (2006.01)
*G08G 1/14* (2006.01)
*G08G 1/04* (2006.01)

(52) U.S. Cl.
CPC ....... *B62D 15/0285* (2013.01); *B62D 15/021* (2013.01); *G08G 1/04* (2013.01); *G08G 1/143* (2013.01)

(58) Field of Classification Search
CPC .................................................. B62D 15/0285
See application file for complete search history.

(56) References Cited

U.S. PATENT DOCUMENTS

| | | | |
|---|---|---|---|
| 8,498,770 B2 | 7/2013 | Takano | |
| 8,571,722 B2* | 10/2013 | Samples | G08G 1/168 701/1 |
| 9,139,226 B2* | 9/2015 | You | B60W 30/06 |
| 9,255,805 B1* | 2/2016 | Ferguson | G01C 21/30 |
| 2011/0116717 A1* | 5/2011 | Lee | G01S 15/025 382/199 |
| 2015/0179075 A1 | 6/2015 | Lee | |
| 2016/0313731 A1* | 10/2016 | Leppanen | B62D 15/0265 |

FOREIGN PATENT DOCUMENTS

| | | |
|---|---|---|
| JP | 2008-033438 A | 2/2008 |
| JP | 4320873 B2 | 8/2009 |
| JP | 2010-018180 A | 1/2010 |
| JP | 4449701 B2 | 4/2010 |
| JP | 2013-542876 A | 11/2013 |
| JP | 2014-004904 A | 1/2014 |
| JP | 2014-106200 A | 6/2014 |
| KR | 10-2013-0036431 A | 4/2013 |
| KR | 10-2014-0079984 A | 6/2014 |
| KR | 10-2014-0087921 A | 7/2014 |
| KR | 10-1498976 B1 | 3/2015 |
| KR | 10-2015-0038776 A | 4/2015 |

* cited by examiner

*Primary Examiner* — Michael Burns
(74) *Attorney, Agent, or Firm* — McDermott Will & Emery LLP (57) ABSTRACT

A parking assist apparatus includes a first sensor for searching first parking spaces which are parkable and located outside a reference distance from a vehicle, a second sensor for searching a second parking space which is parkable and located inside the reference distance from the vehicle and obtaining parking state information of vehicles parked around the vehicle, and a controller for generating a parking slot map using the first parking spaces, the second parking space, and the parking state information and providing the generated parking slot map.

8 Claims, 9 Drawing Sheets

PARKING ASSIST APPARATUS AND METHOD

CROSS-REFERENCE TO RELATED APPLICATION

This application claims the benefit of priority to Korean Patent Application No. 10-2015-0114022, filed on Aug. 12, 2015 with the Korean Intellectual Property Office, the disclosure of which is incorporated herein in its entirety by reference.

TECHNICAL FIELD

The present disclosure relates to a parking assist apparatus and method, and more particularly, to a parking assist apparatus and method capable of recognizing a parking space by generating a virtual parking slot map using a laser scanner and an ultrasonic sensor.

BACKGROUND

In general, according to a smart parking assist system (SPAS), a driver selects a parking mode and a parking direction within a parking space, and the SPAS searches a parkable empty space, a target vehicle, and surrounding obstacles to generate and follow a parking trajectory and park the vehicle in the space.

The smart parking assist system (SPAS) according to the related art described above is referred to as a function of recognizing the space by front/rear/side ultrasonic sensors and automatically assisting the parking without manipulating a steering wheel using voice and image guidance, and a perpendicular parking and a parallel parking system have been developed. The driver only needs to manipulate a transmission and an acceleration pedal according to the voice guidance.

However, the smart parking assist system (SPAS) according to the related art may find the parkable space only in the case in which the vehicle scans while being spaced apart from the parking space using left/right/side ultrasonic sensors to search the parking space.

In addition, since the smart parking assist system (SPAS) according to the related art recognizes the parkable space using the ultrasonic sensors, it is difficult to quickly recognize the parking space out of a searchable range by the ultrasonic sensors.

SUMMARY

The present disclosure has been made to solve the above-mentioned problems occurring in the prior art while advantages achieved by the prior art are maintained intact.

An aspect of the present disclosure provides a parking assist apparatus and method capable of rapidly and easily recognizing a parking space by generating a virtual parking slot map using a laser scanner and ultrasonic sensors and using the virtual parking slot map.

An aspect of the present disclosure also provides a parking assist apparatus and method that perform an autonomous parking and leaving of a vehicle using a parking slot map.

According to an exemplary embodiment of the present disclosure, a parking assist apparatus includes: a first sensor configured to search first parking spaces which are parkable located outside a reference distance from a vehicle; a second sensor configured to search a second parking space which is parkable located inside the reference distance from the vehicle and obtain parking state information of vehicles parked around the vehicle; and a controller configured to generate a parking slot map using the first parking spaces, the second parking space, and the parking state information and provide the generated parking slot map.

According to another exemplary embodiment of the present disclosure, a parking assist method includes: searching first parking spaces which are parkable located outside a reference distance from a vehicle using a first sensor; searching a second parking space which is parkable located inside the reference distance from the vehicle and obtaining parking state information of vehicles parked around the vehicle, using a second sensor; and generating a parking slot map using the first parking spaces, the second parking space, and the parking state information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Figure 1:
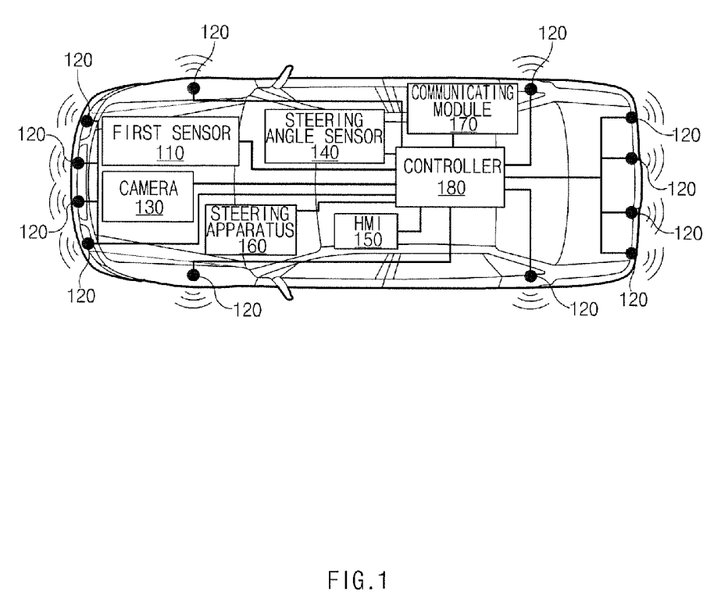
FIG. 1 is a configuration diagram of a parking assist apparatus according to an exemplary embodiment of the present disclosure.

FIG. 1 illustrates a configuration diagram of a parking assist apparatus according to an exemplary embodiment of the present disclosure.

As illustrated in FIG. 1, a parking assist apparatus may include a first sensor 110, a second sensor 120, a camera 130, a steering angle sensor 140, a human machine interface (HMI) 150, a steering apparatus 160, a communicating module 170, and a controller 180.

The first sensor 110 searches first parking spaces located outside a defined reference distance (e.g., 3 meters) from a vehicle. That is, the first sensor 110 obtains information on an empty parking space which is located at a long distance from the vehicle. The present disclosure discloses the case in which one first sensor 110 is installed at a front part of the vehicle, but is not limited thereto. For example, the first sensor 110 may also be additionally installed at a rear part or a side part of the vehicle.

The first sensor 110 may be a laser scanner, a stereo camera, a light detection and ranging (LiDAR), or the like.

The second sensor 120 searches a second parking space located inside the defined reference distance from the vehicle. That is, the second sensor 120 obtains information on an empty parking space which is located at a short distance from the vehicle.

In addition, the second sensor 120 obtains parking state information of other vehicles which are parked around the vehicle. Here, the parking state information includes information on an aligned state and a parking interval (interval) of peripheral vehicles. The aligned state indicates a parking scheme in which the vehicles are parked, and may include perpendicular parking or parallel parking.

The second sensor 120 described above may be an ultrasonic sensor or an around view monitoring (AVM) camera.

For example, the second sensor 120 is configured to include 12 channel ultrasonic sensors including four front ultrasonic sensors of a front part of the vehicle, four rear ultrasonic sensors of a rear part of the vehicle, two front and side ultrasonic sensors of a front and side part of the vehicle, and two rear and side ultrasonic sensors of a rear and side part of the vehicle. However, the second sensor 120 is not limited thereto, but may add or remove the ultrasonic sensor.

The first parking spaces and the second parking space described above are referred to as parkable empty spaces in which the vehicles or obstacles are not present.

The camera 130 photographs an image around the vehicle. The present exemplary embodiment discloses the case in which the camera photographs a front image of the vehicle, but the camera is not limited thereto. For example, two or more cameras may also be provided depending on a configuration form of the parking assist apparatus.

The steering angle sensor 140 is installed in a steering column switch cluster, and measures a steering angle, which is a rotation angle of a steering wheel. The steering angle sensor 140 is used to monitor the steering angle of the vehicle.

The HMI 150 may include a parking operation, a display and audio output means for guiding a driver manipulation, and the like, among parking assistances. The HMI 150 may be any one or more output means of output means such as a cluster, a navigation, an around view monitoring (AVM), and the like.

The HMI (150) is also used as an input means for generating data in response to an input of the user. For example, the HMI (150) displays parking slots that are parkable around a self-vehicle according to a control of the controller 180, and informs the controller 180 about a selected parking slot when any one of the displayed parking slot is selected by the user.

The steering apparatus 160 is an actuator for controlling the steering angle of the vehicle. The steering apparatus 160 may be a motor driven power steering (MDPS). The steering apparatus 160 controls the steering angle of the vehicle according to the control of the controller 180.

The communicating module 170 performs wireless communication with an external terminal located outside the vehicle. Here, the external terminal is a terminal that may perform the wireless communication, such as a smart key, a smart phone, a mobile terminal, or the like.

The communicating module 170 uses a communication technology such as wireless Internet, mobile communication, local area wireless communication, or the like.

The controller 180 generates a virtual parking slot map using the first parking space and the second parking space searched by the first sensor 110 and the second sensor 120, and the parking state information of the peripheral vehicles obtained by the second sensor 120. The parking slot map includes location information on one or more parking slots in which the vehicle may be parked.

The controller 180 obtains information on an end portion (e.g., a wall, a road, or the like) of the parking zone using the image photographed by the camera 130. The controller 180 updates the parking slot map by reflecting the end portion of the parking zone detected by the camera 130.

The controller 180 may store the generated parking slot map in a memory (not illustrated) and may perform an update of the stored parking slot map. The controller 180 may assist a leaving of the vehicle using the parking slot map stored in the memory (not illustrated) at the time of vehicle leaving.

The controller 180 displays the parking slot map on a screen of the HMI 150, and when the user selects a parking slot in which the vehicle is to be parked, from the displayed parking slot map, the controller 180 sets the corresponding parking slot as a target parking slot.

Thereafter, when the setting of the target parking slot is completed or the user inputs a parking initiation command, the controller 180 controls the steering apparatus 160 to park the vehicle in the target parking slot. In this case, the controller 180 monitors the steering angle of the vehicle using the steering sensor 140, and controls the steering apparatus 160 according to the monitored result.

The controller 180 performs the parking of the vehicle or the leaving of the vehicle according to a parking command or a leaving command transmitted from the external terminal through the communicating module 170.

Figure 2:
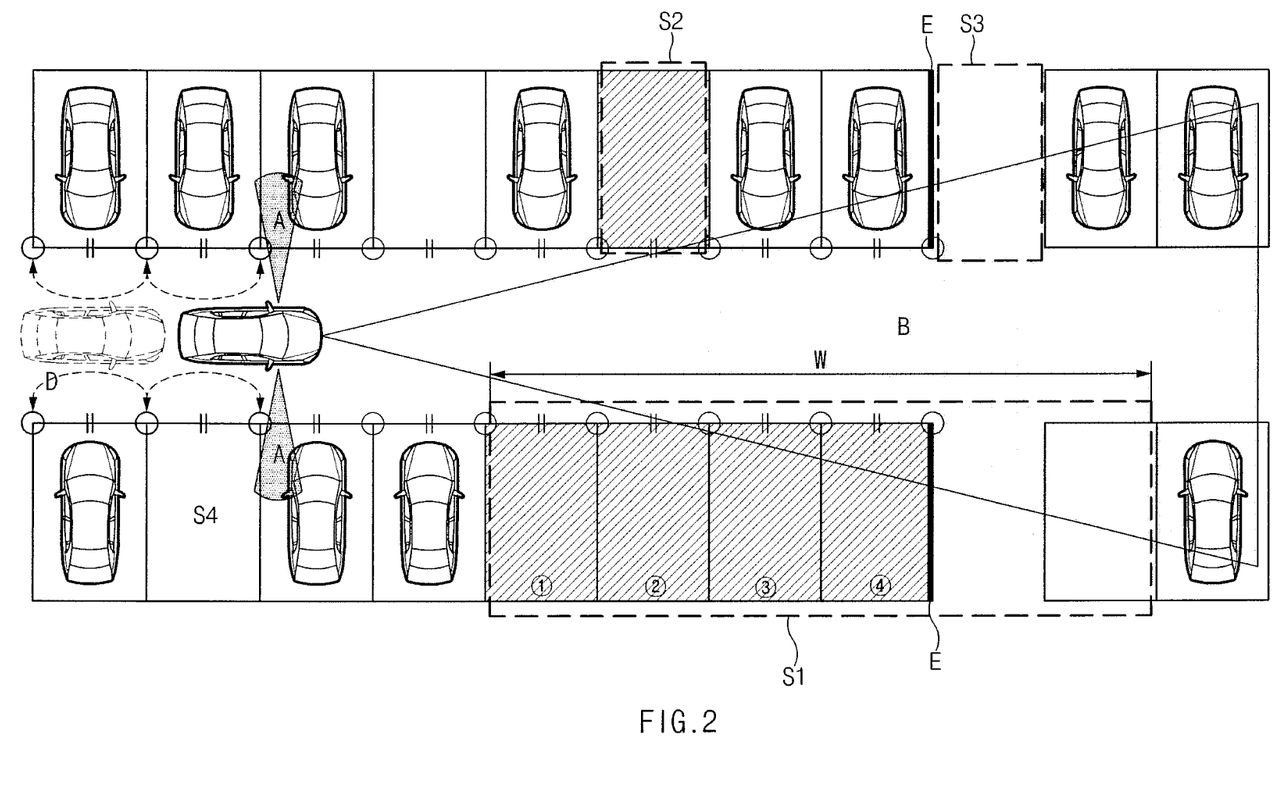
FIG. 2 is a diagram illustrating a generation of a parking slot map according to an exemplary embodiment of the present disclosure.

FIG. 2 is a diagram illustrating a generation of a parking slot map according to an exemplary embodiment of the present disclosure.

In FIG. 2, a region A denotes a range which may be searched by the second sensor 120, and a region B denotes a range which may be searched by the first sensor 110. Sizes of the region A and the region B are merely illustrative, and are not limited to the illustrated ranges. As such, the second sensor 120 may search obstacles (e.g., an aligned state of the vehicles, a parking interval of the vehicles, etc.) which are adjacent to the vehicle and empty spaces, and the first sensor 110 may search information on the obstacle at a long distance and the empty spaces.

The parking assist apparatus searches first parking spaces S1 to S3 located at the long distance using the first sensor 110, and searches a second parking space S4 located at a short distance using the second sensor 120. In this case, the parking assist apparatus may also search parkable empty spaces (parking spaces) either simultaneously or at an interval using the first sensor 110 and the second sensor 120.

The controller 180 confirms whether or not the parking spaces out of a reference parking slot standard are present among the first parking spaces S1 to S3 and the second parking space S4 which are searched. Here, the controller 180 confirms whether or not widths W or lengths of the searched parking spaces are two times greater, or more, than the parking interval of the peripheral vehicles. In other words, if the searched parking space is the perpendicular parking zone, the controller 180 confirms whether or not the width W of the searched parking space is two times greater, or more, than the parking interval D of the peripheral vehicles, and if the searched parking space is the parallel parking zone, the controller 180 confirms whether or not the length of the searched parking space is two times greater, or more, than the parking interval D of the peripheral vehicles.

If there is a parking space S1 of which the width W is two times greater, or more, than the parking interval D of the peripheral vehicles, among the searched parking spaces S1 to S4, the controller 180 partitions the corresponding parking space S1 into two or more parking slots based on the parking interval D of the peripheral vehicles. In addition, the controller 180 generates the parking slot map by including parking slot partition information of the parking space S1 in the searched parking spaces S1 to S4.

Thereafter, the controller 180 recognizes (detects) an end portion E of the parking zone using the camera 130 and updates the parking slot map by reflecting the end portion E of the parking zone to a pre-generated parking slot map. Thereby, the controller 180 filters parking slots ① to ④ to which parking information of the peripheral vehicles of the self-vehicle is reflected, from the searched parking space S1.

Figure 3:
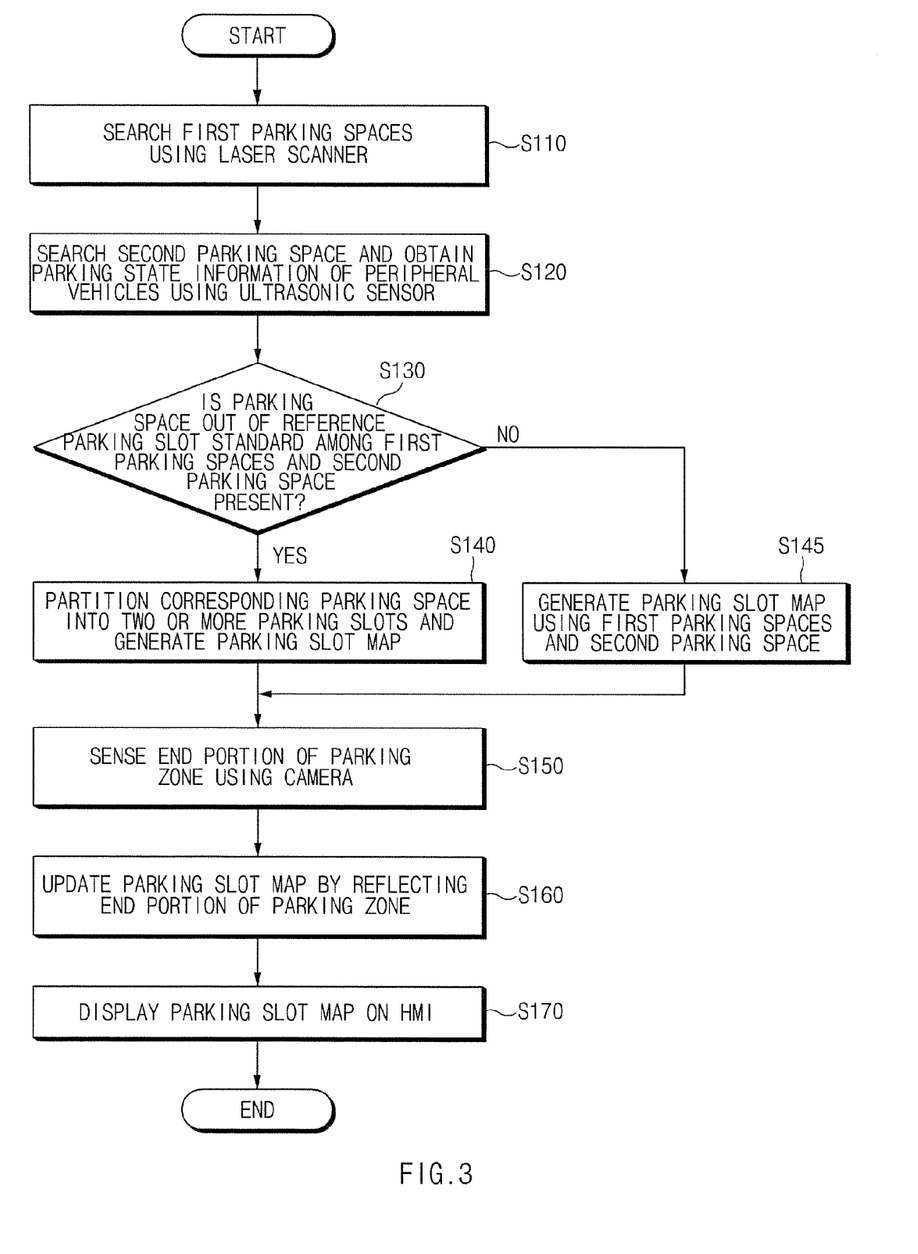
FIG. 3 is a flow chart illustrating a parking assist method according to an exemplary embodiment of the present disclosure.

FIG. 3 is a flow chart illustrating a parking assist method according to an exemplary embodiment of the present disclosure.

The controller 180 of the parking assist apparatus searches the first parking space located outside the defined reference distance from the vehicle, using the first sensor 110 (S110). The controller 180 obtains information on the width and/or length of the first parking space using the first sensor 110. Here, the first parking space is referred to as an empty space in which no vehicles and/or obstacles are present.

The controller 180 searches the second parking space located inside the reference distance from the vehicle using the second sensor 120 and obtains the parking state information of the peripheral vehicles located around the vehicle (S120). Here, the second parking space is referred to as an empty space in which the vehicle may be parked, such as the first parking space. In addition, the parking state information includes the aligned state (parking scheme) of the vehicles parked around the vehicle, information on the parking interval, and the like.

The controller 180 confirms whether or not the parking spaces out of the reference parking slot standard are present among the first parking spaces and the second parking space which are searched (S130). The reference parking slot standard, which is to confirm whether or not two or more vehicles may be parked in the searched parking space, is different depending on the parking scheme. For example, if the searched parking space is the perpendicular parking zone, the controller 180 confirms whether or not the width of the searched parking space is two times greater, or more, than the parking interval of the peripheral vehicles, and if the searched parking space is the parallel parking zone, the controller 180 confirms whether or not the length of the searched parking space is two times greater, or more, than the parking interval of the peripheral vehicles.

If there are such parking spaces out of the reference parking slot standard among the first parking spaces and the second parking space which are searched, the controller 180 generates the parking slot map by partitioning the corresponding parking space into two or more parking slots (S140). In this case, the controller 180 partitions the parking slot based on the aligned state of the peripheral vehicles and the parking interval of the peripheral vehicles. In addition, the controller 180 generates the parking slot map by reflecting the parking slot partition info/motion to the first parking spaces and the second parking space.

Next, the controller 180 detects the end portion of the parking zone in which the vehicle is located, using the camera 130 (S550).

The controller 180 updates the parking slot map by reflecting the detected end portion of the parking zone to the pre-generated parking slot map (S160).

The controller 180 outputs the updated parking slot map to the HMI 150 (S170). The HMI 150 may display the parking slot map on the screen to allow the user to confirm the parkable parking slot.

Meanwhile, if there are no such parking spaces out of the reference parking slot standard among the first parking spaces and the second parking space which are searched in the operation (S130), the controller 180 generates the parking slot map using the first parking spaces and the second parking space. In this case, the first parking spaces and the second parking space each have a parking slot in which one vehicle may be parked.

Figure 4:
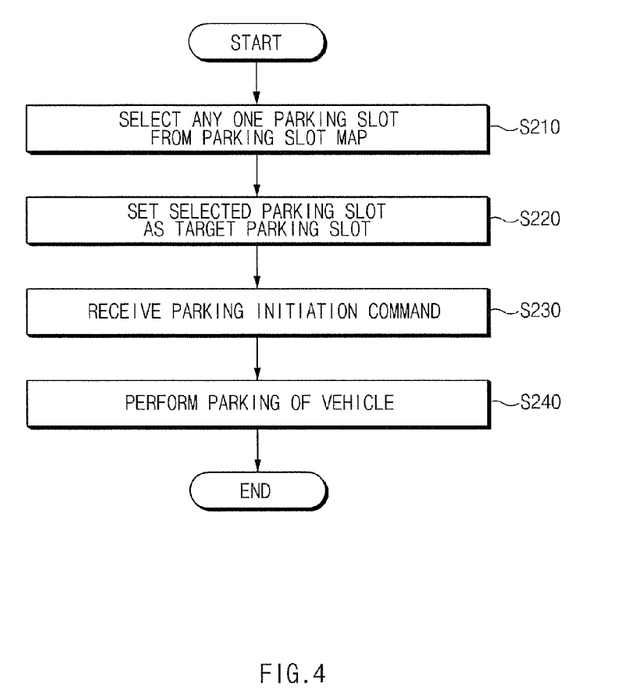
FIG. 4 is a flow chart illustrating a parking assist method of a parking assist apparatus according to an exemplary embodiment of the present disclosure.

FIG. 4 is a flow chart illustrating a parking assist method of a parking assist apparatus according to an exemplary embodiment of the present disclosure.

First, the parking assist apparatus searches (recognizes) a parkable parking space through the operations as illustrated in FIG. 3 to generate the parking slot map, and displays the generated parking slot map on the HMI 150.

Thereafter, the controller 180 of the parking assist apparatus selects any one parking slot from the parking slot map in response to the user input (S210). In this case, the HMI 150 transmits intonation on a location of the parking slot selected by the user to the controller 180.

The controller 180 sets the selected parking slot as a target parking slot in which the vehicle is to be parked (S220).

If the controller 180 receives a parking initiation command after setting the target parking slot, the controller 180 performs a parking of the vehicle in the set target parking slot (S230, S240). The present exemplary embodiment describes the case in which the vehicle parking is performed when the parking initiation command is received, by way of example, but the present disclosure is not limited thereto. For example, the present disclosure may also be implemented so that the parking of the vehicle is performed as soon as the setting of the target parking slot is completed.

Figure 5:
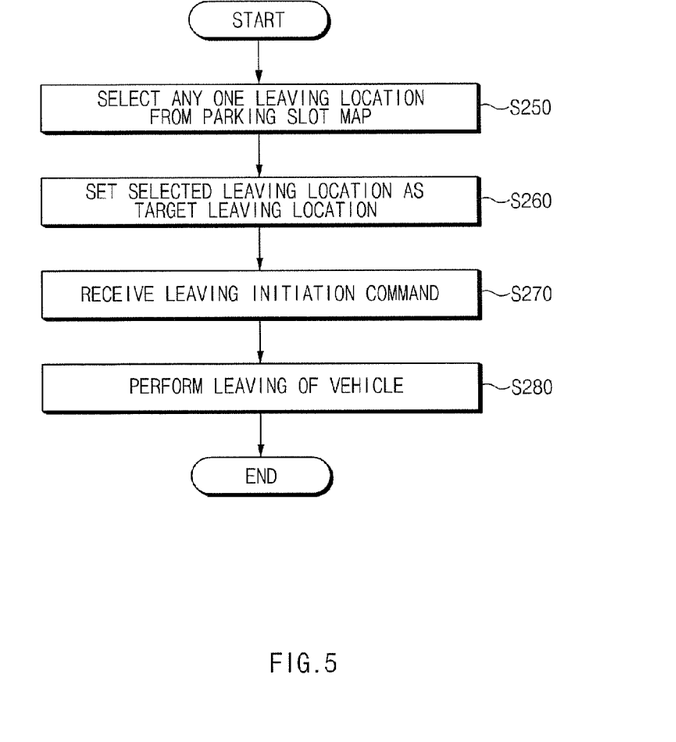
FIG. 5 is a flow chart illustrating a leaving assist method of a parking assist apparatus according to an exemplary embodiment of the present disclosure.

FIG. 5 is a flow chart illustrating a leaving assist method of a parking assist apparatus according to an exemplary embodiment of the present disclosure.

The controller 180 selects any one leaving location from the parking slot map in response to the user input (S250). In this case, the HMI 150 transmits information on the leaving location selected by the user to the controller 180.

The controller 180 sets the selected leaving location as a target leaving location from which the vehicle is to leave (S260).

If the controller 180 receives a leaving initiation command after setting the target leaving location, the controller 180 performs a leaving of a vehicle to the set target leaving location (S270, S280). The present exemplary embodiment describes the case in which the leaving of the vehicle is performed when the leaving initiation command is received, by way of example, but the present disclosure is not limited thereto. For example, the present disclosure may also be implemented so that the leaving of the vehicle is performed as soon as the setting of the target leaving location is completed.

In the exemplary embodiment described above, the parking initiation command and the leaving initiation command may be input through a separate input means included in the vehicle or may also be received from an external terminal.

Figure 6:
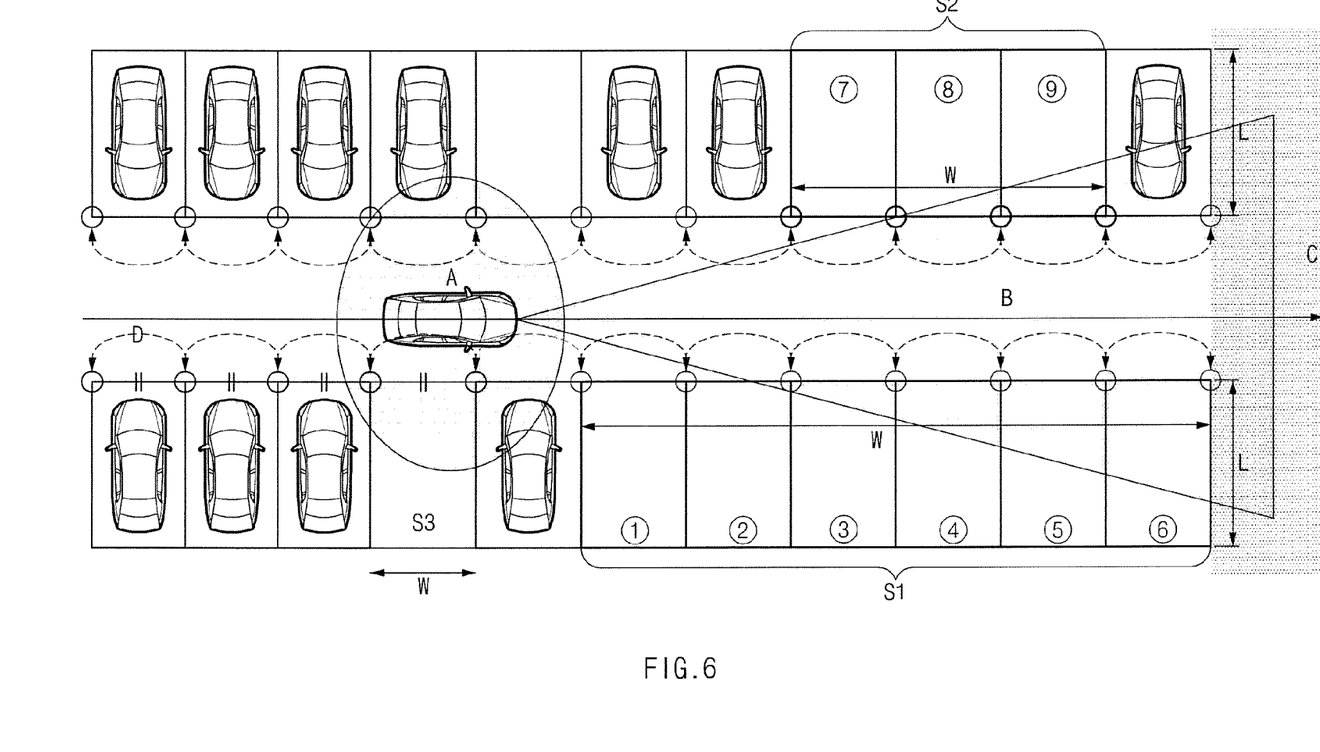
FIG. 6 illustrates an example in which a parking space is recognized in a perpendicular parking zone according to an exemplary embodiment of the present disclosure.

FIG. 6 illustrates an example in which a parking space is recognized in a perpendicular parking zone according to an exemplary embodiment of the present disclosure.

The parking assist apparatus included in the vehicle recognizes the parking spaces S1 and S2 which are at a long distance, using the first sensor 110. In addition, the parking assist apparatus recognizes the parking space S3 which is at a short distance, using the second sensor 120. In this case, the controller 180 of the parking assist apparatus obtains the parking state information of the vehicles parked around the self-vehicle using the second sensor 120.

Then, the controller 180 generates the virtual parking slot map using the parking spaces S1 and S2 which are at the long distance and the parking space S3 which is at the short distance. In this case, the controller 180 generates two or more virtual parking slots from the parking spaces S1 and S2 which are at the long distance, out of the reference parking slot standard based on the parking state information. For example, the controller 180 sets the virtual parking slots for the parking spaces S1 and S2 which are at the long distance, having widths W which are two times greater, or more, than the parking interval D of the peripheral vehicles. That is, the controller 180 generates six virtual parking slots ① to ⑥ from the parking space S1 which is at the long distance, and generates three virtual parking slots ⑦ to ⑨ from the parking space S2 which is at the long distance. The controller 180 generates the parking slot map to which the generated virtual parking slots are reflected.

Thereafter, the controller 180 senses an end portion C of the parking zone in which the self-vehicle is located using the camera 130 and updates the parking slot map by reflecting the sensed end portion C of the parking zone to the parking slot map.

Figure 7:
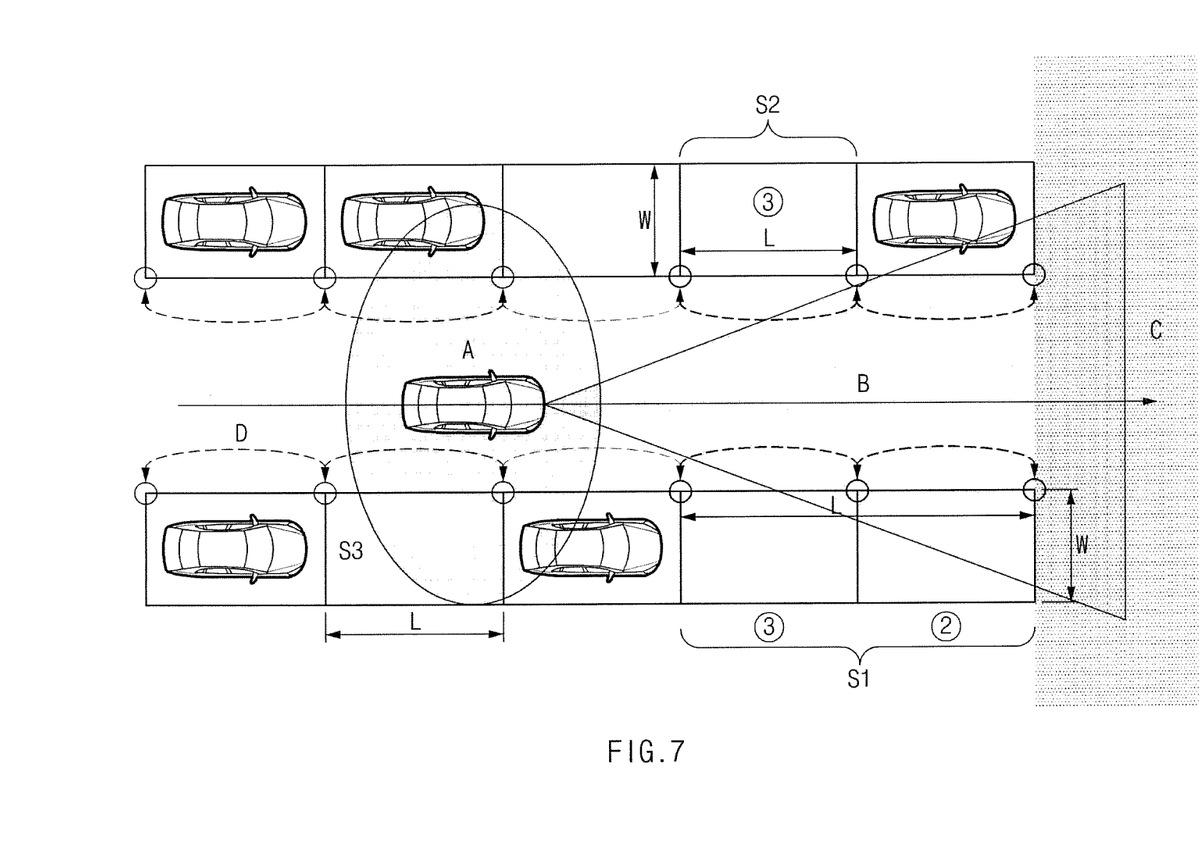
FIG. 7 illustrates an example in which the parking space is recognized in a parallel parking zone according to an exemplary embodiment of the present disclosure.

FIG. 7 illustrates an example in which a parking space is recognized in a perpendicular parking zone according to an exemplary embodiment of the present disclosure.

The controller 180 of the parking assist apparatus recognizes the parking spaces S1 and S2 which are at the long distance and the parking space S3 which is at the short distance, using the first sensor 110 and the second sensor 120. In addition, the controller 180 confirms whether or not a length L of the recognized parking space is two times greater, or more, than a parking interval D of the vehicle around the self-vehicle. As a continuation result, the controller 180 detects the parking space S1 which is at the long distance.

Then, the controller 180 partitions the parking space S1 which is at the long distance into two or more parking slots ① and ② based on the parking interval D. In addition, the controller 180 generates the parking slot map using the parking spaces S1 and S2 which are at the long distance, and the parking space S3 which is at the short distance to which two or more parking slots ① and ② are reflected.

Thereafter, the controller 180 senses an end portion C of the parking zone in which the self-vehicle is located using the camera 130 and updates the parking slot map by reflecting the sensed end portion C of the parking zone to the parking slot map.

While the exemplary embodiment described above describes the case in which the parking assist apparatus is operated in a state in which the driver boards the vehicle, the present disclosure is not limited thereto. For example, the present disclosure may also be implemented so that the driver is provided with the parking slot map from the parking assist apparatus and selects the target parking slot to perform an autonomous parking, using an external terminal which may perform wireless communication, such as a smart phone, outside the vehicle.

Figure 8:
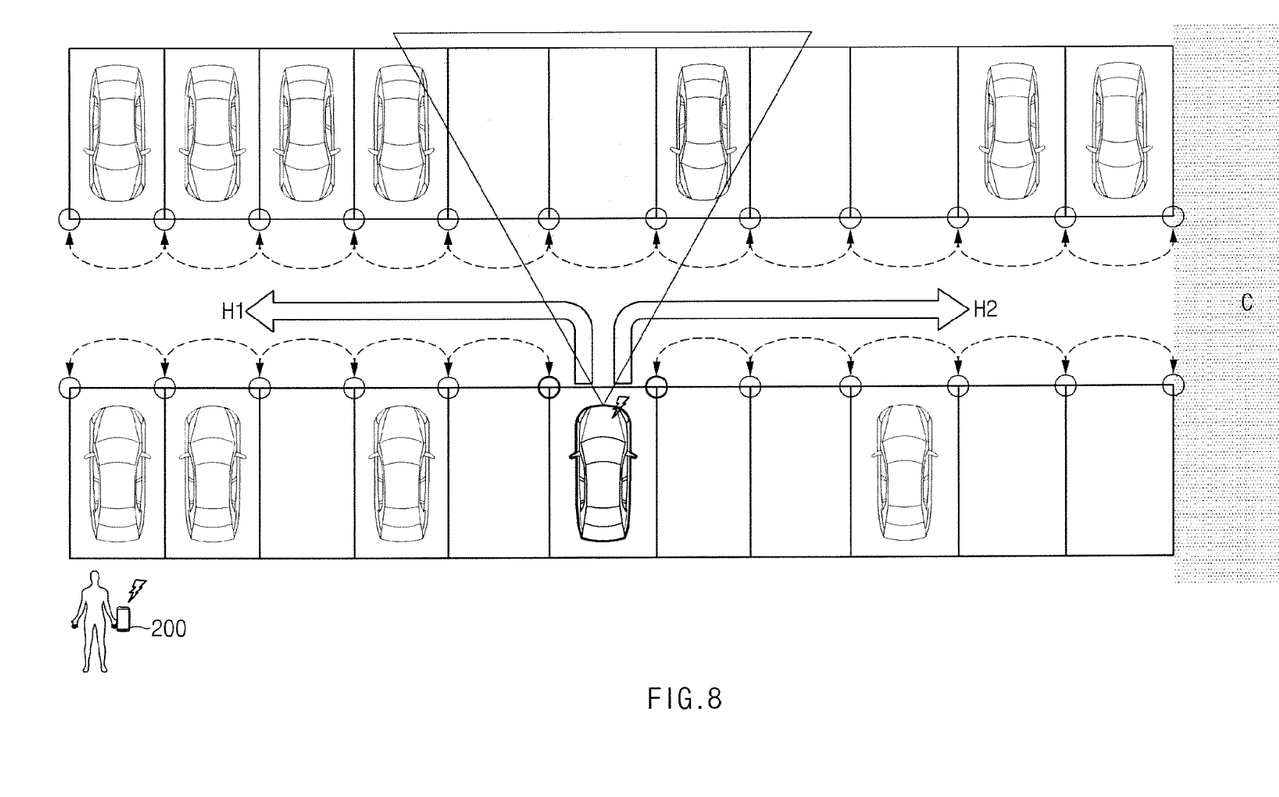
FIGS. 8 and 9 are diagrams illustrating an autonomous leaving of a vehicle according to an exemplary embodiment of the present disclosure.
Figure 9:
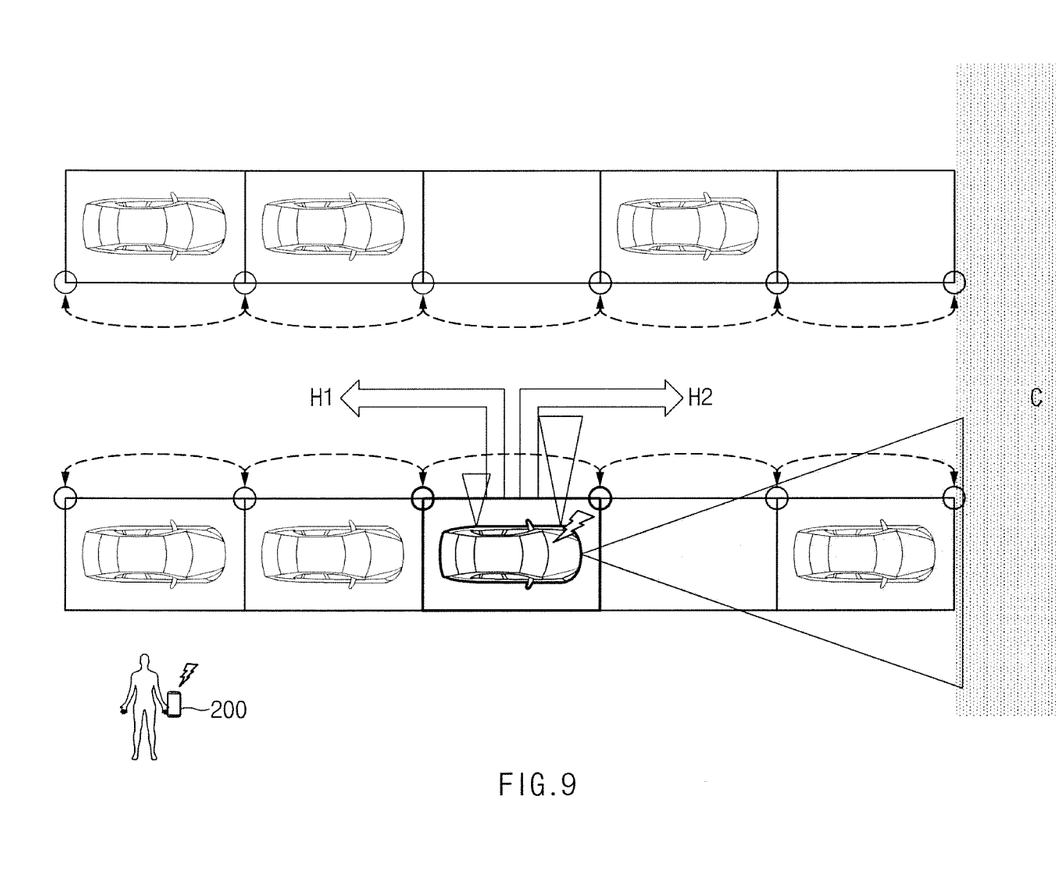

FIGS. 8 and 9 are diagrams illustrating an autonomous leaving of a vehicle according to an exemplary embodiment of the present disclosure.

As illustrated in FIGS. 8 and 9, in a situation in which the vehicle is parked in the perpendicular parking or the parallel parking, the driver transmits a leaving command to the parking assist apparatus using an external terminal 200. Here, the external terminal 200 includes a communicating module (not illustrated) which may perform wireless communication with the communicating module 170 of the parking assist apparatus.

In addition, the external terminal 200 may select a leaving direction H1 or H2 at the time of the leaving command.

If the parking assist apparatus receives the leaving command from the outside, the parking assist apparatus controls a driving apparatus, a braking apparatus, and the like, other than the steering apparatus 160 to allow the parked vehicle to leave from the parking slot. In addition, the parking assist apparatus may move the vehicle to a point at which the external terminal 200 is located.

The present exemplary embodiment describes the case in which an autonomous leaving of the vehicle to the point at which the external terminal 200 is located is performed, by way of example, but the present disclosure is not limited thereto. For example, the present disclosure may also be implemented so that the leaving of the vehicle and the autonomous leaving of the vehicle to a specific point (including a road or a destination) of the parking slot map provided to the user from the inside/outside the vehicle may be performed.

As described above, according to the present disclosure, the parking assist apparatus may rapidly and easily recognize the parking space by generating a virtual parking slot map using the laser scanner and the ultrasonic sensors and using the virtual parking slot map. As a result, convenience of the user may be increased and satisfaction of the user may be improved.

In addition, according to the present disclosure, the parking assistance may be more exactly performed by utilizing the virtual parking slot map, and may be performed even in a space in which neither the target vehicle nor an obstacle is present.

In addition, the present disclosure may be applied to an autonomous parking technology, thereby making it possible to assist the autonomous parking of the vehicle into, or the leaving of the vehicle from, the parking space using the virtual parking slot map after the driver exits from the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A parking assist method comprising:
    searching first parking spaces which are parkable located outside a reference distance from a vehicle using a first sensor;
    searching a second parking space which is parkable located inside the reference distance from the vehicle and obtaining parking state information of vehicles parked around the vehicle, using a second sensor; and generating a parking slot map using the first parking spaces, the second parking space, and the parking state information, wherein in the step of generating the parking slot map, when a parking space out of a reference parking slot standard among the first parking spaces and the second parking space is present, the corresponding parking space is partitioned into two or more parking slots based on the parking state information.

2. The parking assist method according to claim 1, wherein the first sensor is a laser scanner.

3. The parking assist method according to claim 1, wherein the second sensor is an ultrasonic sensor.

4. The parking assist method according to claim 1, further comprising:
   detecting an end portion of the parking space using information on an image photographed by a camera after the step of generating the parking slot map; and
   updating the parking slot map by reflecting the end portion of the parking space accordingly.

5. The parking assist method according to claim 1, wherein the parking state information includes information on an aligned state and a parking interval of peripheral vehicles parked around the vehicle.

6. The parking assist method according to claim 5, wherein the aligned state indicates a scheme in which the vehicles are parked, and includes perpendicular parking and parallel parking.

7. The parking assist method according to claim 1, further comprising:
   setting any one parking slot from the parking slot map as a target parking slot, after the step of generating the parking slot map;
   receiving parking initiation command after setting the target parking slot; and
   when the parking initiation command is received, performing a parking of the vehicle in the target parking slot.

8. The parking assist method according to claim 7, further comprising:
   setting any one leaving location from the parking slot map as a target leaving location;
   receiving a leaving initiation command after the step of setting the target leaving location; and
   when the leaving initiation command is received, performing a leaving of the vehicle to the target leaving location.

* * * * *